Nov. 28, 1933.   R. F. POE   1,937,126
SHOCK ABSORBER
Filed Feb. 19, 1931   2 Sheets-Sheet 2
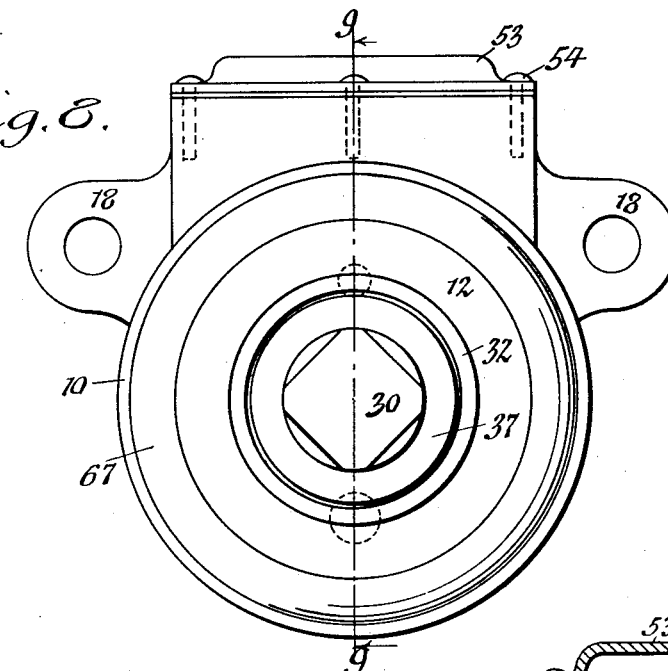
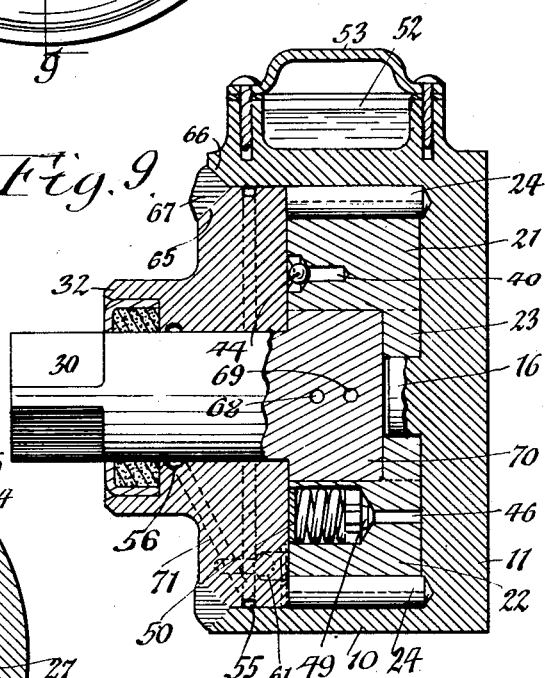
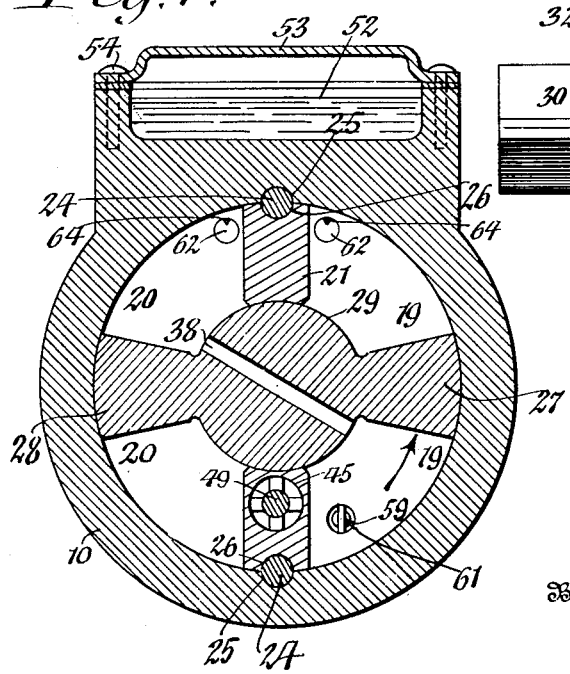

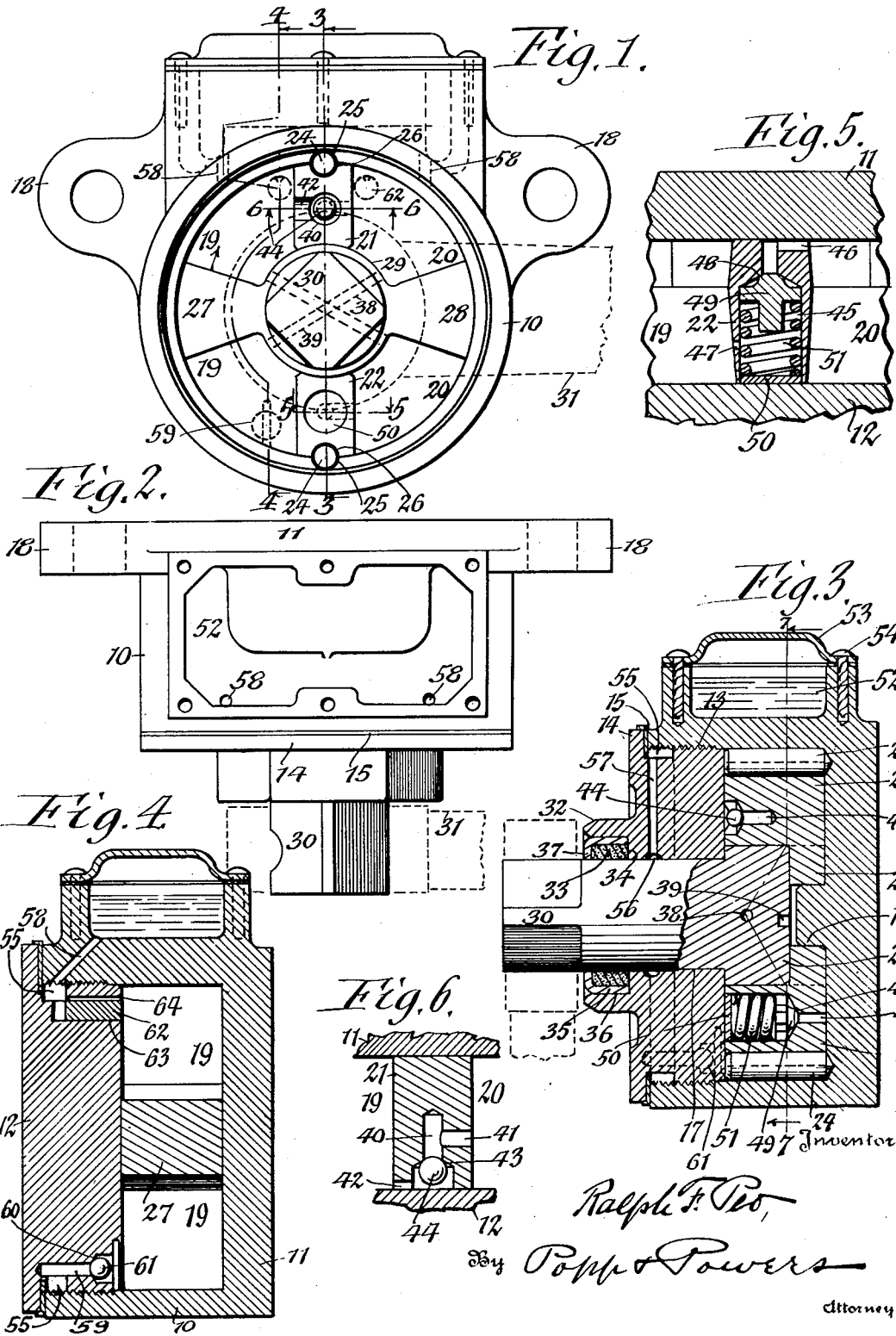

Patented Nov. 28, 1933

1,937,126

UNITED STATES PATENT OFFICE 1,937,126

SHOCK ABSORBER

Ralph F. Peo, Buffalo, N. Y., assignor to Houde Engineering Corporation, Buffalo, N. Y., a corporation of New York Application February 19, 1931. Serial No. 516,966

7 Claims. (Cl. 188—89)

This invention relates to a shock absorber of the hydraulic type for absorbing the shock between two relatively movable bodies, such for example as the frame and axle of an automobile which move relatively to one another while the car is passing over uneven places in the roadway.

The object of this invention is to produce a shock absorber of this character which is simple and compact in construction, low in cost of production, efficient in operation and not liable to get out of order.

In the accompanying drawings:—

Fig. 1 is a front elevation of an approved form of my invention with the front cover or head of the body, the operating arm and associated parts omitted.

Fig. 2 is a top plan view of the same with the cover of the replenishing chamber omitted.

Figs. 3 and 4 are vertical longitudinal sections taken on the correspondingly numbered lines in Fig. 1.

Figs. 5 and 6 are fragmentary horizontal sections, on an enlarged scale, taken on lines 5—5 and 6—6, Fig. 1, respectively.

Fig. 7 is a vertical transverse section taken on line 7—7, Fig. 3.

Fig. 8 is a front elevation of the shock absorber embodying my invention and showing a modified form of the same.

Fig. 9 is a vertical longitudinal section taken on line 9—9, Fig. 8.

In the following description similar characters of reference indicate like parts in the several figures of the drawings.

The body of the hydraulic shock absorber shown in Figs. 1-7 comprises a peripheral wall 10, a rear head 11 which closes the rear end of the space within said wall and is preferably formed integral therewith, as shown in Figs. 3 and 4, and a front wall 12 which is preferably removably secured to the front end of the peripheral wall and connected therewith by means of a screw joint 13 between the periphery of the head 12 and the front part of the bore of the wall 10. At its margin the front head 12 is provided with an annular flange 14 which overlaps the front end of the wall 10, a leak-tight joint being produced between these parts by interposing a packing 15 between the same.

The inner side of the rear head 11 is provided with a forwardly projecting centering pin 16 and the front head 12 is provided with a central bearing 17 which latter and the centering pin 16 are axially in line with each other and with the axis of the bore of the peripheral wall 10.

The body of the shock absorber is attached to one of the relatively movable members between which the shock is to be absorbed, for instance the frame of an automobile, for which purpose this body is provided on its opposite sides with perforated lugs 18 which are adapted to receive bolts, screws or similar fastenings for attaching the body to said frame.

The space between the cylindrical bore of the wall 10 and the opposing inner flat faces of the rear and front heads of the same is divided into two working chambers 19, 20 by a partition having two diametrically opposite sections 21 and 22 arranged respectively above and below the axis of the body and engaging their outer ends with the bore of the circular wall 10. Adjacent to the rear wall 11 the inner ends of the partitions are connected with each other by means of a centering ring 23 which fits over the centering pin 16 of the rear head, as shown in Fig. 3. Rotation of this partition is prevented by two retaining pins 24, each of which is arranged horizontally and lengthwise and engages with a circular seat formed partly in the bore of the wall 10, as shown at 25 and partly in the outer end of the respective partition section, as shown at 26 in Fig. 1. Each of the retaining pins therefore crosses a joint between the respective partition section and the peripheral wall of the body and not only assists in holding the partition against turning but also serves to close this joint so as to prevent leakage of liquid through the same from one side of this partition to the other.

The two working chambers are adapted to contain a resistance liquid which operates to absorb the shock to which the relatively movable members are subjected and this liquid is displaced in the working chambers from one end thereof to the other by two pistons 27, 28 which engage their outer ends with the bore of the peripheral wall while their inner ends are connected with each other by a hub 29 which engages its opposite sides with the inner ends of the partition sections 21 and 22.

The numeral 30 represents an operating shaft which is journaled in the bearing 17 on the front head and connected at its rear end with the hub 29 while its front end is provided outside of the absorber body with an operating arm 31 which is adapted to be connected with the other member which is movable relatively to the frame of the automobile such for example as the axle which carries the running wheels of the automobile and is connected with the frame of the same by means of a spring system. On its front side the front head of the body is provided with a neck 32 having a countersunk recess on its front side which receives a packing for producing a leak-tight joint between the front part of the front head 12 and the operating shaft, which packing in the present case consists of a packing ring 33 surrounding the shaft 30 and bearing at its rear end against the bottom 34 of the recess in said neck and a retaining ring having an annular longitudinal flange 35 interposed between the periphery of the packing ring 30 and the bore 36 of the neck and a transverse flange 37 arranged at the front end of the retaining ring 35 and bearing against the outer end of the packing ring 33, as shown in Fig. 3.

During the oscillation of the pistons in the working chambers some of the resistance liquid therein is always permitted to pass from the high and low pressure ends of each working chamber to the corresponding ends of the other working chamber for the purpose of balancing the pressures in the same, this being preferably accomplished in the present instance by a diametrical passage 38 formed in the piston hub and connecting the low pressure ends of the working chambers, as shown in Fig. 7, and a similar passage 39 arranged on the inner end of the hub 29 and connecting the high pressure ends of the working chambers.

Means are, however, provided whereby the flow of resistance liquid from the low pressure end of one working chamber to the high pressure end of the other working chamber is permitted with comparative freedom so as to effect a comparatively low shock absorbing action of the absorber but the flow of the resistance liquid in the opposite direction, that is to say from the high pressure end of one working chamber to the low pressure end of the other working chamber is cut off and thereby confines the resistance liquid to a greater extent in the high pressure end of one of the working chambers as the piston therein moves to the respective end of the same and thereby increases the shock absorbing action of the instrument at this time accordingly. This is preferably accomplished in the present case by a check valved port which includes a check valve chamber 40 arranged in the upper partition section 21 and extending to the front end thereof, an inlet 41 connecting the rear end of this valve chamber with the low pressure end of the working chamber 20 on one side of this partition, an outlet 42 formed in the front end of the respective partition section and extending from the front end of the valve chamber 40 to the adjacent high pressure end of the working chamber 19, a valve seat 43 formed in the valve chamber 40 and facing toward the high pressure end of the working chamber 19 and a ball valve 44 arranged in the valve chamber 40 and movable toward and from the valve seat 43 therein, as shown in Figs. 1, 3, 6.

As the pistons effect a low pressure stroke, which is in a direction reverse to that indicated by the arrows in Figs. 1 and 7 while the frame and axle of the car move one toward the other the resistance liquid is permitted to pass with comparative freedom from the upper end or low compression end of the working chamber 20 through the check valved port in the partition 21 to the upper or high compression end of the working chamber 19 during which time the check valve 44 is opened and does not obstruct the flow of resistance liquid therethrough.

When, however, the pistons effect a high pressure stroke in the direction indicated by the arrows in Figs. 1 and 7 which occurs when the frame and axle of the car move away from each other, then the check valve 44 engages the seat 43 and thus confines the resistance liquid in the upper or high compression end of the working chamber 19 and causes the same to offer a higher resistance to the upward movement of the piston 27 and thereby increase the shock absorbing effect of the instrument accordingly.

Relief means are provided for automatically unloading part of the resistance liquid from the high pressure end of one of the working chambers to the low pressure end of the other working chamber for rendering riding of the car more agreeable.

In instruments of this type, as heretofore constructed, the spring load relief valve is made to release at low enough pressure to avoid an uncomfortable ride over small obstructions, such as cobblestones or bricks, at which time the movements are rapid but short, but the control of the riding qualities over large obstructions which produce violent, heavy bumps or depressions of longer duration is not sufficient.

A relief valve mechanism has therefore been provided in which a valve chamber acts as an intermediate pressure chamber and a spring closed valve therein is lifted from its seat by the differential in pressure between the high compression side of a working chamber and the valve chamber containing the spring pressed relief valve.

This relief valve mechanism may be variously organized and that shown in Figs. 1, 3, 5 and 7 of the drawings as a satisfactory example being constructed as follows:

Formed in the lower partition 22 is a relief port which preferably comprises a relatively large valve chamber 45 which may extend to the front end of this partition section, an inlet 46 arranged at the rear end of the partition 22 and extending laterally from the rear end of the valve chamber 45 to the high pressure end of the working chamber 20, an outlet 47 extending from the intermediate part of the valve chamber 45 to the low pressure end of the working chamber 19, a valve seat 48 arranged around the inlet 46 at the rear end of the valve chamber 45 and facing toward the low pressure end of the working chamber 19, a relief check valve 49 arranged in the valve chamber 45 and movable toward and from the seat 48 therein, a supporting disk 50 arranged in the front part of the valve chamber 45 and engaging with the inner side of the front wall 12, and a spring 51 arranged in said valve chamber and bearing at its opposite ends against the relief check valve 49 and the supporting disk 50 or other support.

The outlet 47 should be made comparatively small so as to retard the passage of resistance liquid therethrough, the size of the outlet being varied to suit the desired capacity of the instrument. This orifice 47 is so proportioned that at extremely high velocities it will operate as a choke to retard the flow of resistance through the passage 46, 45, 47 independently of the retarding action of the valve 49, thereby obtaining what may be termed a modified viscous pressure control in which the orifice 47 serves as a control valve.

The spring 51 of this relief check valve device is sufficiently heavy so that when the instrument is subjected to normal loads this spring will hold the relief check valve 49 in its closed position and, when the piston 28 is moving toward the high pressure end of the working chamber 20, will confine the liquid resistance therein and thereby cause the shock absorber to offer a comparatively high resistance or shock absorbing effect to the load which is imposed upon the instrument at this time. If, however, an unusually heavy load is placed upon the instrument at this time which is greater than that for which the instrument was designed to carry under normal conditions, then the excess pressure which is developed in the high pressure end of the working chamber 20 will cause the relief check valve 49 to be automatically pushed away from its seat 48 and open the relief passage 46, 45 and 47 through the partition section 22 whereby some of the resistance liquid is permitted to pass from the high pressure end of the working chamber 20 into the low pressure end of the working chamber 19. Excessive pressure in the shock absorber is therefore relieved at this time so that the same is not strained unduly and the pasengers are not subjected to an uncomfortable riding action.

Under a comparatively slow movement of the pistons, during normal weather, or such movement during warm weather, when the resistance liquid is thinned and the pressure within the instrument will not rise above a fixed limit, the valve 49 will lift or unseat only after the necessary pressure has reached a sufficiently high point, and if the velocity of the liquid passing this valve at this time is sufficiently high, this valve remains open and maintains a constant pressure in the high pressure end of the respective working chamber during the high pressure stroke of the pistons.

Means are provided whereby the resistance liquid in the working chambers is replenished as required and means are also provided for preventing the escape of resistance liquid through the joints of the body to the exterior of the valve while the same is under internal pressure which means are embodied in the features of the present improvements and are constructed as follows:

The numeral 52 represents a replenishing chamber arranged on the upper side of the peripheral wall 10 of the body and adapted to contain a reserve supply of resistance liquid which is conducted to the working chamber as required. This resistance liquid is introduced into the replenishing chamber through an opening in the top thereof which opening is normally closed by means of a cap 53 which is secured to the upper end of the replenishing chamber by means of driving screws 54, as best shown in Fig. 3, or by any other suitable or approved means.

On the front part of the periphery of the front head 12 of the body is formed an annular recuperating groove 55 which together with the adjacent part of the bore of the peripheral wall forms an annular recuperating channel which is adapted to receive any resistance liquid which may possibly leak forwardly through the joint between the front head 20 and the peripheral wall 10 of the body when the instrument is subjected to internal pressure.

Between its front and rear ends the bore of the bearing 17 in which the shaft 30 turns is provided with an annular intercepting groove 56 which is adapted to receive or intercept any resistance liquid which may be forced forwardly from the working chambers through the joint between the cooperating surfaces of the operating shaft and the bearing 17 during the internal pressure to which the instrument is subjected. Any resistance fluid which may be intercepted by the groove 56 is conducted to the recuperating groove 55 by means of a branch passage 57 extending from the intercepting groove 56 to the recuperating groove 55, as shown in Fig. 3. When the resistance liquid thus recovered in the recuperating groove is in excess of the capacity of this groove and the passages connecting therewith then the excess of such liquid is conducted from the recuperating groove by one or more passages 58 to the replenishing chamber, each of which passages is arranged in the rear part of the peripheral wall of the body and extends from the upper part of the recuperating groove 55 to the lower part of the replenishing chamber 52, as shown in Figs. 1, 2 and 4.

When additional resistance liquid is required in the working chambers this is supplied thereto by means of a replenishing port or passage 59 leading from the lower part of the recuperating groove 55 to the lower part of one of the working chambers, for example the working chamber 19, as shown in Figs. 1, 4 and 7, which replenishing port contains a valve seat 60 facing toward the respective working chamber and is adapted to be engaged by a check valve 61 capable of moving toward and from this seat 60. When the working chambers require additional resistance liquid this is automatically supplied thereto by the flow of resistance liquid from the replenishing chamber 52 thence through the recuperating groove 55 and thence through the replenishing port 59 into the lower end of the working chamber 19 after which it is distributed to the parts of both working chambers during the operation of the instrument by means of the check-valved by-pass port in the upper partition section 21 and the relief port in the lower partition section 22. When the requisite amount of resistance liquid has been supplied to the working chambers the replenishing port 59 is automatically closed by the pressure within the working chambers which act upon the check valve 61 for closing the latter against the seat 60.

For the purpose of permitting any air which may be present in the resistance liquid to escape therefrom and thereby prevent the instrument from becoming airbound one or more vent plugs 62 are provided each of which is arranged in an opening 63 in the upper part of the front wall 12 of the body and is provided in its upper side with a longitudinal groove forming a vent port 64 leading from the upper part of one of the working chambers to the adjacent upper part of the recuperating groove 55, as shown in Figs. 1, 4 and 7.

Instead of connecting the front head 12 of the shock absorber body with the peripheral wall thereof by means of a screw joint, as shown in Figs. 3 and 4, this may be effected by means of an electrically welded joint between this head and the peripheral wall of the body, as shown in Figs. 8 and 9, in which case the adjacent edges of the head 12 and the wall 10 are provided with beveled surfaces 65 and 66 which form between them an annular V-shaped groove for the reception of a connecting ring 67 of metal which is fused to both the front head 12 and the peripheral wall 10 of the body for forming an integral joint which permanently connects the same.

In this modified form of my invention the equalizing ports or passages 68, 69 which connect the opposite ends respectively of the working chambers are both formed wholly within the hub 70 of the operating shaft 30, as shown in Fig. 9 and the intercepting groove 56 is connected with the lower part of the recuperating groove 55 by means of a branch passage 71 instead of being connected directly with the upper part thereof, as shown in Fig. 3. In other respects this modified form of my invention is substantially the same as that shown in Figs. 1–7.

I claim as my invention:

1. A hydraulic shock absorber comprising a body having a peripheral wall, a rear head formed integrally with said wall, and a front head connected with said wall and provided with a central bearing, the space enclosed by said wall and heads forming at least one working chamber which is adapted to contain a resistance liquid, a piston oscillating in said working chamber, and an operating shaft journaled in said bearing and connected with said piston, said front head being provided with a peripheral groove forming with the inner side of said wall an annular recuperating passage, a branch passage leading from said recuperating passage to the bore of said bearing, and a return passage leading from the lower part of said recuperating passage to the lower part of said working chamber.

2. A hydraulic shock absorber comprising a body having a peripheral wall, a rear head formed integrally with said wall, and a front head connected with said wall and provided with a central bearing, the space enclosed by said wall and heads forming at least one working chamber which is adapted to contain a resistance liquid, a piston oscillating in said working chamber, and an operating shaft journaled in said bearing and connected with said piston, said wall being provided on its upper side with a liquid replenishing chamber, and said front head having a recuperating passage on its periphery which is connected by a branch passage with said replenishing chamber, by another branch passage with the bore of said bearing and by a check valved replenishing passage with said working chamber.

3. A hydraulic shock absorber comprising a body having a peripheral wall, a rear head formed integrally with said wall, and a front head connected with said wall and provided with a central bearing, the space enclosed by said wall and heads forming at least one working chamber which is adapted to contain a resistance liquid, a piston oscillating in said working chamber, and an operating shaft journaled in said bearing and connected with said piston, said wall being provided on its upper side with a liquid replenishing chamber, and said front head having a recuperating passage on its periphery which is connected by a branch passage with said replenishing chamber, by another branch passage with the bore of said bearing, by a vent passage with the upper part of said working, and by a check valved replenishing passage with the lower part of said working chamber.

4. A hydraulic shock absorber comprising a body having a peripheral wall, a rear head, and a front head provided with a central bearing, the space between said wall and heads being divided by diametrically opposite partition sections into two working chambers which are adapted to contain resistance liquid, each of said working chambers having high and low pressure ends and each partition section being arranged between the high pressure end of one working chamber and the low pressure end of the other working chamber, pistons oscillating in said working chambers, an operating shaft journaled in said bearing and connected with said pistons, a by-pass port arranged in one of said partition sections and connecting the high and low pressure ends of the working chambers on opposite sides of the same and having a valve seat facing toward the respective high pressure end of the respective working chamber, a check valve arranged in said by-pass port and adapted to engage the seat therein during high pressure strokes of said pistons, a relief port arranged in the other partition and connecting the high and low pressure ends of the working chambers on opposite sides of the same and having a valve seat facing toward the respective low pressure end of the respective working chamber, a relief valve arranged in said relief chamber, and a spring arranged in said relief chamber and operating on said relief valve for holding the same yieldingly in engagement with the seat in the relief port.

5. A hydraulic shock absorber comprising a body having a peripheral wall, a rear head, and a front head provided with a central bearing, the space between said wall and heads being divided by diametrically opposite partition sections into two working chambers which are adapted to contain resistance liquid, each of said working chambers having high and low pressure ends and each partition section being arranged between the high pressure end of one working chamber and the low pressure end of the other working chamber, pistons oscillating in said working chambers, an operating shaft journaled in said bearing and connected with said pistons, a by-pass port arranged in one of said partition sections and connecting the high and low pressure ends of the working chambers on opposite sides of the same and having a valve seat facing toward the respective high pressure end of the respective working chamber, a check valve arranged in said by-pass port and adapted to engage the seat therein during high pressure strokes of said pistons, a relief port formed in the other partition section and consisting of a valve chamber having a valve seat at its inner end and having its outer end extending to an edge of said partition section which is opposite the inner side of one of said heads, and said valve chamber having an inlet at one end which leads to the high pressure end of one of said working chambers and an outlet at its other end leading to the low pressure end of the other working chamber, a relief valve arranged in said relief valve chamber, a bearing disk arranged in said relief valve chamber and engaging the adjacent head of the body, and a spring arranged in said relief valve chamber between said relief valve and bearing disk and operating to hold said relief valve shut during normal loads on the shock absorber but to permit said relief valve to open during abnormally high loads on the shock absorber and allow resistance liquid to pass through the relief port from the high pressure end of one working chamber to the low pressure end of the other working chamber at such times.

6. A hydraulic shock absorber comprising a peripheral wall having a rear head and having a front head connected by a joint with said wall, the space enclosed by said wall and heads forming a working chamber adapted to contain a resistance liquid, a piston operating in said working chamber, there being a peripheral recuperating channel between said peripheral wall and front head, said channel being exposed to the joint between said front head and wall to intercept any liquid escaping through said joint connection during pressure stroke of said piston, a passage for conducting fluid from said recuperating channel back to the working chamber, and a check valve in said passage for checking flow of fluid from said working chamber to said recuperating channel.

7. A hydraulic shock absorber comprising a body having a peripheral wall, a permanent rear head, and a front detachable head connected by a joint with said wall, the space enclosed by said wall and heads forming a working chamber adapted to contain a resistance liquid, a piston operating in said working chamber, there being a peripheral recuperating channel between said peripheral wall and said front head, said channel being exposed to the joint between said front head and wall to intercept any liquid escaping though said joint connection during pressure stroke of said piston, a replenishing chamber formed in said body above said working chamber, a passage connecting said replenishing chamber with the top of said recuperating channel, and a second passage connecting the bottom of said recuperating channel with said working chamber whereby fluid may flow from said replenishing chamber into said working chamber, and a check valve in said second passage for preventing flow of fluid from said working chamber to said recuperating channel.

RALPH F. PEO.